(12) United States Patent
Junk et al.

(10) Patent No.: US 8,567,570 B2
(45) Date of Patent: Oct. 29, 2013

(54) BRAKE ASSEMBLY FOR A PORTABLE GENERATOR

(75) Inventors: Richard A. Junk, Elkhorn, WI (US); Ryan S. Jaskowiak, Mukwonago, WI (US); Gregory G. Wesolowski, Pewaukee, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 692 days.

(21) Appl. No.: 12/780,480

(22) Filed: May 14, 2010

(65) Prior Publication Data

US 2011/0278111 A1  Nov. 17, 2011

(51) Int. Cl.
  *B60B 33/00*  (2006.01)
(52) U.S. Cl.
  USPC .................. 188/1.12; 188/9; 188/21; 188/19; 188/265
(58) Field of Classification Search
  USPC .................. 188/9, 21, 29, 2 F, 19, 1.12, 265; 16/35 R
  See application file for complete search history.

(56) References Cited

U.S. PATENT DOCUMENTS

| | | | |
|---|---|---|---|
| 1,371,886 A | 3/1921 | Gage | |
| 1,558,628 A | 10/1925 | Purcell | |
| 2,572,548 A | 10/1951 | Weisz et al. | |
| 2,707,794 A | 5/1955 | Kramcsak, Jr. | |
| 3,500,965 A | 3/1970 | Nossokoff et al. | |
| 4,226,413 A | 10/1980 | Daugherty | |
| 4,333,326 A | 6/1982 | Winters | |
| 4,336,629 A * | 6/1982 | Jarvis et al. | 16/35 R |
| 5,042,622 A * | 8/1991 | Smith et al. | 188/1.12 |
| 5,328,000 A | 7/1994 | Rutter et al. | |
| 5,383,536 A | 1/1995 | Butter et al. | |
| 5,497,856 A | 3/1996 | Block et al. | |
| 6,139,034 A | 10/2000 | Williams | |
| 6,286,632 B1 * | 9/2001 | Chai | 188/29 |
| 6,584,641 B1 * | 7/2003 | Milbredt | 16/35 R |
| 2008/0088103 A1 | 4/2008 | Sloat | |
| 2008/0264733 A1 * | 10/2008 | Hayes et al. | 188/1.12 |
| 2010/0013177 A1 * | 1/2010 | Horn, Jr. | 280/47.24 |

* cited by examiner

*Primary Examiner* — Bradley King
(74) *Attorney, Agent, or Firm* — Foley & Lardner LLP (57) ABSTRACT

A brake assembly for use with a portable generator includes a frame, a shaft, a brake surface, and an actuator. The frame is designed to be attached to the portable generator. The shaft is supported by the frame, and the brake surface is connected to an end of the shaft. The actuator includes a foot pedal, a cam, and a pivot, where the pivot is coupled to both the foot pedal and the cam and provides for rotation of the foot pedal and the cam about a portion of the frame. The cam of the actuator translates the shaft between a released position and a braked position during operation of the brake assembly.

11 Claims, 8 Drawing Sheets

FIG. 12 ic # BRAKE ASSEMBLY FOR A PORTABLE GENERATOR

BACKGROUND

The present disclosure relates generally to the field of portable equipment. More specifically the present disclosure relates to a brake assembly for use with a portable generator.

A heavy piece of portable equipment may be supported by a frame having wheels, treads, rollers, casters, or other rolling elements for moving the equipment from place to place, as needed. For example, a portable generator typically includes a combustion engine and an electric alternator, both of which are heavy items. The engine and alternator are carried in a frame or housing, the sum weight of which would otherwise make transporting the generator difficult, but for the use of wheels attached to the frame.

However, once the portable generator has been moved to a work site, unrestrained wheels may allow the generator to roll, if left unattended. Accordingly, a braking mechanism may be integrated with the portable generator, to hold fixed the wheels when the generator is positioned at a desired location for operation.

SUMMARY

One embodiment of the invention relates to a brake assembly for use with a portable generator. The brake assembly includes a frame, a shaft, a brake surface, and an actuator. The frame is designed to be attached to the portable generator. The shaft is supported by the frame, and the brake surface is connected to an end of the shaft. The actuator includes a foot pedal, a cam, and a pivot, where the pivot is coupled to both the foot pedal and the cam and provides for rotation of the foot pedal and the cam about a portion of the frame. The cam of the actuator translates the shaft between a released position and a braked position during operation of the brake assembly. The brake assembly may be lockable with an external lock to prevent theft.

Another embodiment of the invention relates to a brake assembly for use with portable equipment. The brake assembly includes a frame, a shaft, a brake surface, a lever, and a locking feature. The frame is designed to be fastened to the portable equipment, and to support the shaft, which has the brake surface on an end thereof. The lever coupled to the shaft and pivotable about a portion of the frame. Further, the lever is movable between a released position and a braked position, and movement of the lever translates the shaft. The locking feature includes an aperture formed in the frame, where the aperture is sized and positioned in the frame such that a shackle of a padlock may be placed through the aperture when the lever is in the braked position, locking the lever in the braked position.

Yet another embodiment of the invention relates to portable equipment, including a wheel assembly, a brake member, and an actuator. The wheel assembly includes at least one of an axle and a wheel. The brake member includes a shaft and a brake surface connected to the shaft. The actuator is for the brake member, and includes a foot pedal, a cam, and a pivot. The cam is coupled to the foot pedal, and the pivot is coupled to both the foot pedal and the cam. Operation of the foot pedal rotates the cam, which translates the shaft relative to the wheel assembly. Translation of the shaft selectively engages or disengages the brake surface with at least a portion of the wheel assembly, to brake or release the portable equipment.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
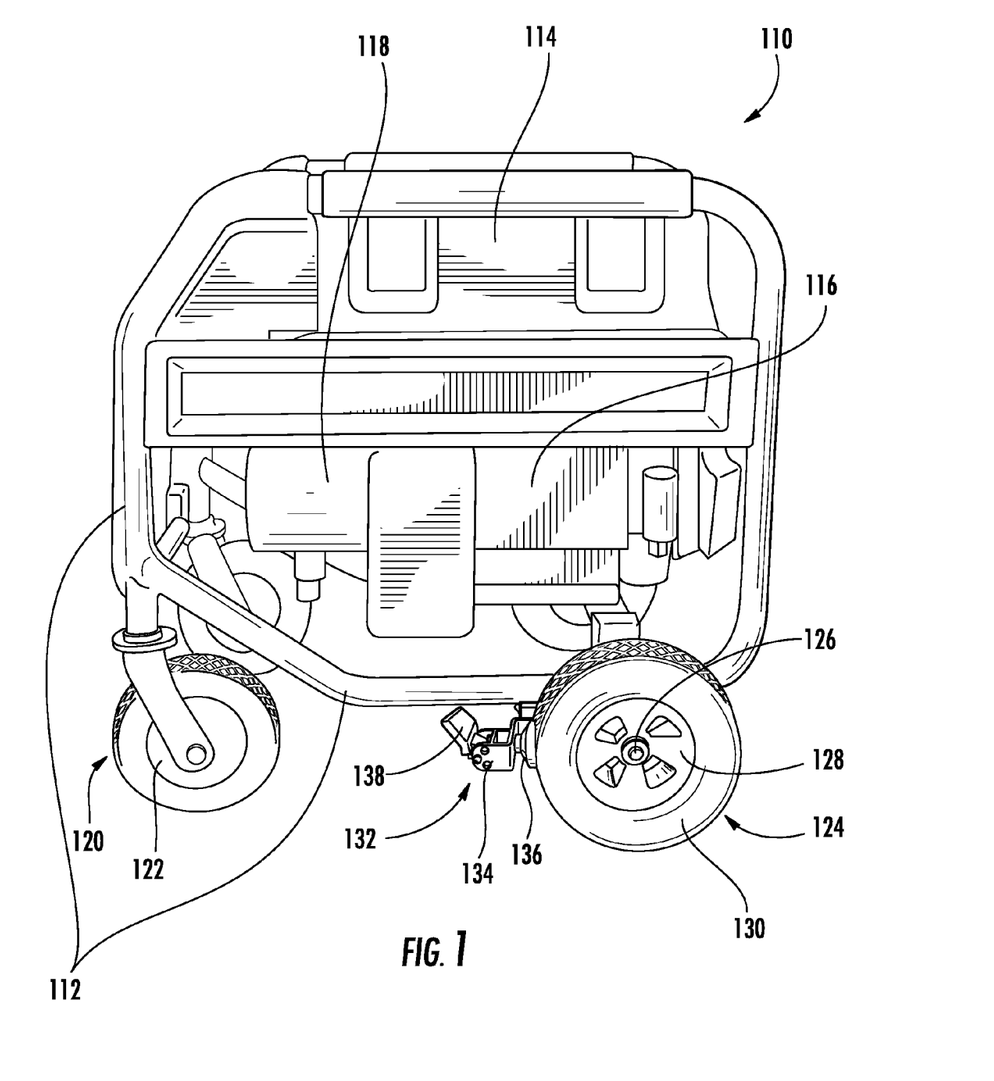
FIG. 1 is a view from the side of a portable generator according to an exemplary embodiment of the invention.

Referring to FIG. 1, portable equipment in the form of a portable generator 110 includes a frame 112 supporting a fuel tank 114, an engine 116, and an alternator 118. Fuel is delivered from the fuel tank 114 to power the engine 116, which drives the alternator 118, producing electricity. According to an exemplary embodiment, the fully-loaded weight of the portable generator is over 100 pounds, and thus benefits from the use of wheel assemblies 120, 124 for portability. However, other embodiments may weigh less than 100 pounds.

According to an exemplary embodiment, the portable generator 110 includes a wheel assembly 124 (e.g., primary wheel assembly, rear wheel assembly) having an axle 126 coupled to hubs 128 supporting tires 130 on a rearward end of a bottom of the portable generator 110. The portable generator 110 further includes an auxiliary wheel assembly 120 (e.g., caster assembly, forward wheel assembly) having casters 122 positioned on a forward end of the bottom of the portable generator 110. Inward from the wheel assembly 124

(i.e., closer toward the middle of the bottom of the portable generator 110), the portable generator 110 includes a brake assembly 132.

The brake assembly 132 includes a frame 134 (e.g., brake frame, bracket, support structure) supporting a brake member 136 and an actuator 138 for engaging or disengaging the brake member 136. According to an exemplary embodiment, engagement of the brake member 136 by the actuator 138 locks the tire 130 of the wheel assembly 124, which in turn limits movement of the portable generator 110. Positioning the brake assembly 132 toward the middle of the bottom of the portable generator 110, such as between the wheel assemblies 120, 124, is intended to allow for foot activation of the brake assembly 132, while concurrently positioning the brake assembly 132 generally out of the walking path of an operator moving the portable generator 110.

In other contemplated embodiments, a piece of portable equipment may include only a single set of wheels (e.g., used in conjunction with legs or pegs), treads, six or eight wheels, a motor-powered drive train, or other forms of wheel assemblies to facilitate movement of the portable equipment. While the equipment shown in FIG. 1 is the portable generator 110, other forms of equipment compatible with the present disclosure include pressure washers, snow throwers, lawn mowers, rotary tillers, and still other portable equipment.

Figure 2:
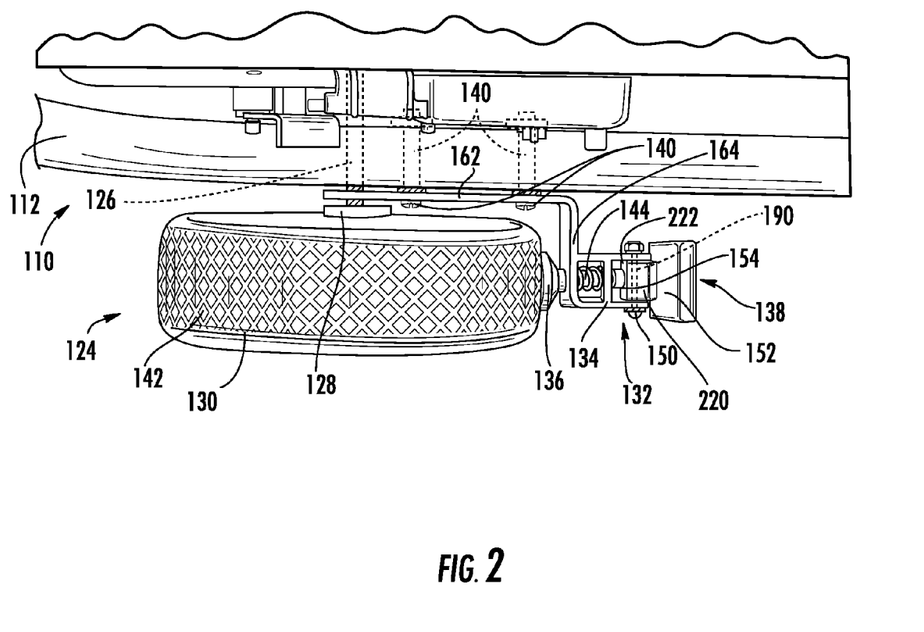
FIG. 2 is a view from above of a wheel assembly of the portable generator of FIG. 1.

Referring to FIG. 2, the downward view of the portable generator 110 from above the wheel assembly 124 shows the brake assembly 132, the tire 130, and the frame 112 of the portable generator 110. The tire 130 is coupled to the frame 112 by way of the axle 126. A bushing positioned on the axle 126 may be integrated with the hub 128 of the wheel assembly 124. The brake assembly 132 is positioned forward of the tire 130 and is fastened to the frame 112 of the portable generator 110.

Figure 3:
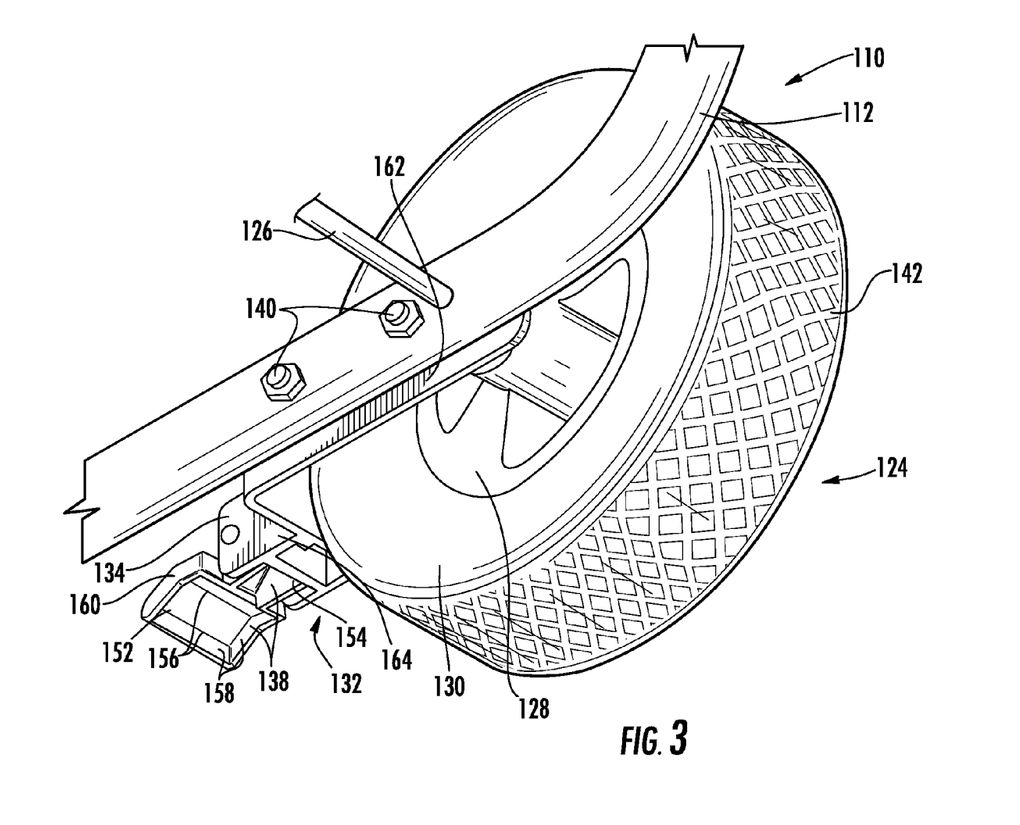
FIG. 3 is a view from below of the wheel assembly of the portable generator of FIG. 1.

Referring to FIG. 3, the upward view from below the portable generator 110 also shows the frame 112 of the portable generator 110, the tire 130 of the wheel assembly 124, and the frame 134 of the brake assembly 132. According to an exemplary embodiment, the frame 134 of the brake assembly 132 is fastened to the frame 112 of portable generator 110 by fasteners 140 (e.g., nuts and bolts, screws, rivets, pins, spot welds, etc.) and is further looped around the axle 126, between the frame 112 and the hub 128 of the wheel assembly 124.

According to an exemplary embodiment, the tire 130 is formed from rubber, composite, or another material, such as a material having both flexibility (e.g., elastic modulus of approximately 0.01 to 0.2 GPa) and toughness. In some embodiments, the tires 130 are pneumatic, and in other embodiments the tires 130 are solid rubber (or another material). According to an exemplary embodiment, treading 142 on the tires 130 is intended to increase traction and control wearing of the tires 130. As shown in FIG. 2, the brake member 136 of the brake assembly 132 is designed to selectively engage the tire 130 (and tread thereof) of the wheel assembly 124.

Figure 4:
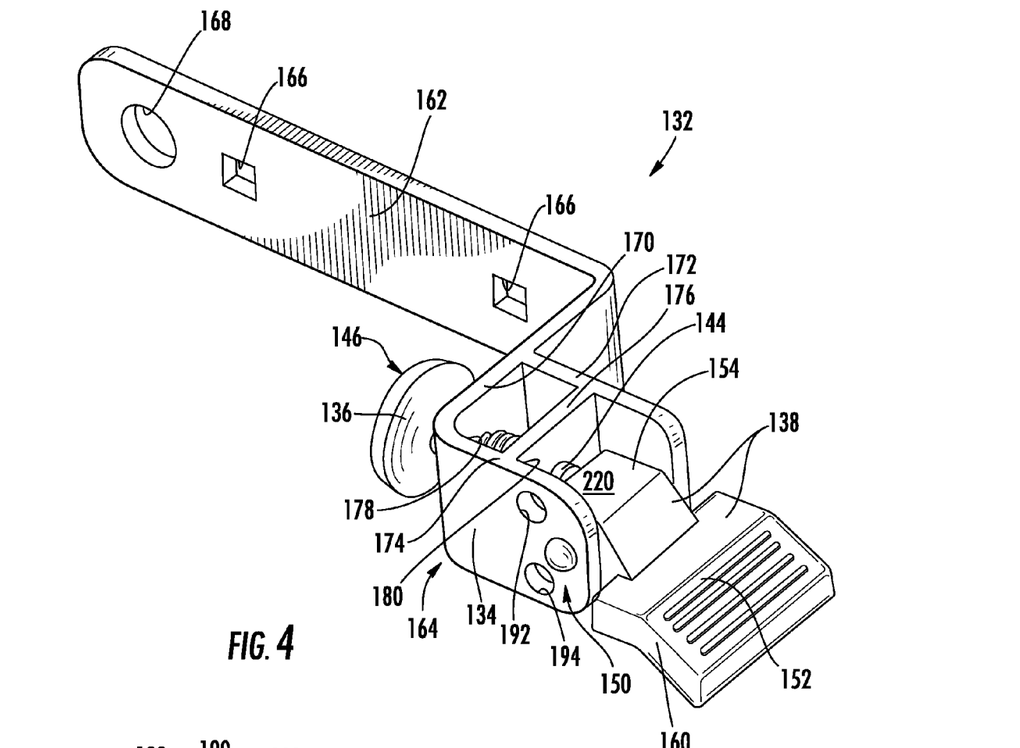
FIG. 4 is a view of a brake assembly according to an exemplary embodiment of the invention.
Figure 5:
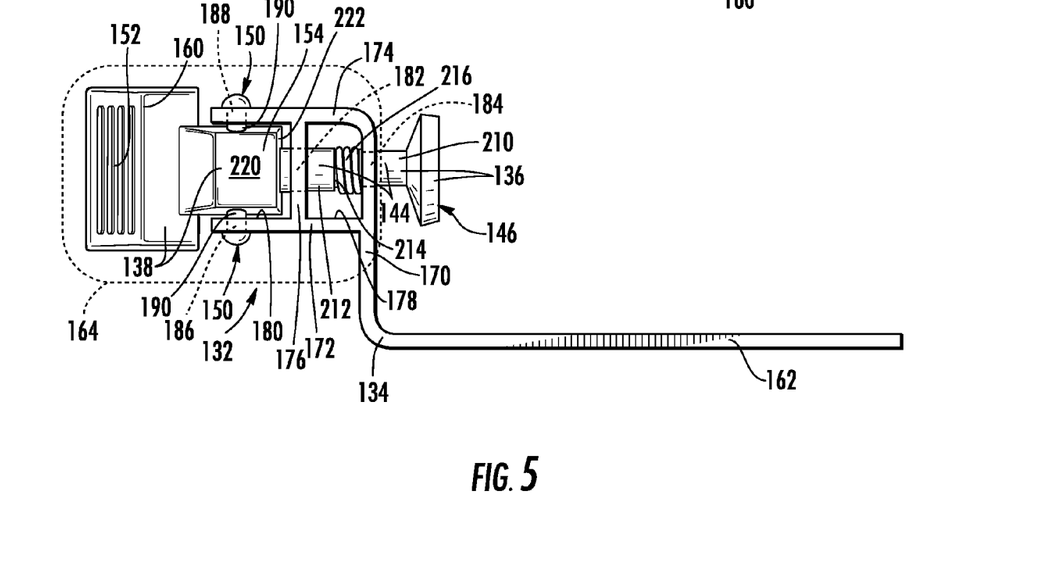
FIG. 5 is a top view of the brake assembly of FIG. 4.

Referring to FIGS. 4-5, the brake assembly 132 includes the brake member 136, the actuator 138, and the frame 134, which supports the brake member 136 and the actuator 138. The brake member 136 includes a shaft 144 that extends through the frame 134 toward the tire 130 (see FIG. 2). According to an exemplary embodiment, the brake member 136 is configured to move (e.g., translate, slide) through portions of the frame 134 during operation of the brake assembly 132. A brake surface 146 (see FIGS. 4-5) is attached to the end of the shaft 144.

According to an exemplary embodiment, the actuator 138 of the brake assembly 132 functions as a lever that is rotatable about a pivot 150 coupled to the frame 134. One side of the lever is a foot pedal 152 upon which an operator may step to move (e.g., rotate, pivot, actuate) the actuator 138. The other side of the lever includes a cam 154 that is designed to drive (e.g. push, translate) the shaft 144 of the brake member 136 relative to the frame 134 of the brake assembly 132 and to the tire 130 of the wheel assembly 124. In some embodiments where the actuator 138 functions as a lever, the lever provides a mechanical advantage between the foot pedal 152 and the cam 154 (e.g., an approximate ratio of 5:1).

According to an exemplary embodiment, the foot pedal 152 of the actuator 138 includes a curved surface having a downward bend 160. The downward bend 160 in the foot pedal 152 is intended to facilitate vertically applying leverage on the foot pedal 152 (i.e., by stepping down), when the foot pedal 152 is a raised position (e.g., 90-degrees upward, 45-degrees upward). A tread 142 on the foot pedal may provide an improved griping surface. Also, the foot pedal 152 is wider than the cam 154, providing increased surface area for foot placement.

In contemplated embodiments, the frame 134 of the brake assembly 132, above and/or below the cam 154, includes a backstop (e.g., projection) that limits rotation of the actuator 138 about the pivot 150. In other embodiments, the structure of the frame 134 and the actuator 138 together may limit (e.g., block) rotation of the actuator 138. In some such embodiments, rotation of the actuator 138 is limited (e.g., by backstops) to an arc of about 90-degrees or less.

According to an exemplary embodiment, the foot pedal 152 of the actuator 138 is rigidly coupled to the cam 154. However, in other embodiments, intermediate mechanisms (e.g., gears) transfer force from a foot pedal or other input to a cam or other output of the actuator of a brake mechanism. According to an exemplary embodiment, the actuator 138 of the brake assembly 132 may be molded as an integral piece, with reinforcement folds 156 and transverse structure 158. However in other embodiments, the actuator 138 or other portions of the brake assembly (e.g., frame 134, brake member 136) may be formed from separate pieces fastened together.

Still referring to FIGS. 4-5, the frame 134 of the brake assembly 132 includes a bracket portion 162 (e.g., first portion) and a support portion 164 (e.g., second portion) integrally connected to the bracket portion 162 and extending therefrom. The bracket portion 162 includes holes 166 for fasteners 140 (see FIG. 2) to be inserted through, to fasten the bracket portion 162 to the frame 112 of the portable generator 110 or other portable equipment. In some embodiments, the bracket portion 162 further includes an opening 168 through which the axle 126 (see FIG. 2) of the wheel assembly 124 may be inserted, providing additional support for coupling the brake assembly 132 to the frame 112 of the portable generator 110.

According to an exemplary embodiment, the support portion 164 of the frame 134 of the brake assembly 132 further includes an outward projection portion 170 extending substantially orthogonal to the bracket portion 162. When the brake assembly 132 is installed on the portable generator 110, the outward projection portion 170 extends away from the frame 112 of the portable generator 110, which positions (e.g., aligns) the brake member 136 toward the center of the tire 130 (see FIG. 2).

According to such an embodiment, the support portion 164 of the frame 134 further includes two rearward extension portions 172, 174 and a cross-member portion 176 therebetween, which may be formed integrally with the outward projection portion 170. A first of the rearward extension portions 172 (e.g., inside extension) is on a side of the support portion 164 that is closer to the rest of the portable generator 110 than the second rearward extension portion 174 (e.g., outside extension).

The arrangement of the support portion 164 of the frame 134 is intended to provide structural support for the actuator 138 and the brake member 136. In some embodiments, the first rearward extension portion 172 defines a plane that lies substantially parallel with a plane defined by the bracket portion 162 of the frame 134 of the brake assembly 132. The plane defined by the first rearward extension portion 172 is substantially orthogonal to a plane defined by the outward projection portion 170. The second rearward extension portion 174 defines a plane substantially parallel with the plane defined by the first rearward extension portion 172. The cross-member portion 176 defines a plane generally orthogonal to the planes defined by the two rearward extension portions 172, 174, and parallel with the plane defined by the outward projection portion 170.

According to an exemplary embodiment, a first compartment 178 is formed by the outward projection portion 170, the two rearward extension portions 172, 174, and the cross-member portion 176 of the support portion 164 of the frame 134 of the brake assembly 132. A second compartment 180 is formed between the two rearward extension portions 172, 174 and the cross-member portion 176. In such an embodiment, the outward projection portion 170 and the cross-member portion 176 include apertures 182, 184 respectively, formed therein, which are positioned on opposite sides of the first compartment 178 and are aligned with each other. In some embodiments, the apertures 182, 184 are both circular. According to an exemplary embodiment, the aperture 184 in the cross-member portion 176 is wider (e.g., has a greater diameter) than the aperture 182 in the outward projection portion 170.

According to such an embodiment, the two rearward extension portions 172, 174 include apertures 186, 188 for receiving a pin 190 (see FIG. 2). In addition, the second rearward extension portion 174 (e.g., outside wall) includes two holes 192, 194, each of which are sized to receive a shackle 196 of a padlock 198 (see FIG. 10) (e.g., external lock, keyed lock). According to an exemplary embodiment, the holes 192, 194 are circular and have a diameter of at least ⅛ inch. In other embodiments, only one hole is included. In some embodiments, the holes are elongate slots, rectangular, or otherwise shaped.

According to an exemplary embodiment, the shaft 144 of the brake member 136 extends through the apertures 182, 184 of the outward projection portion 170 and the cross-member portion 176, and as such extends through the first and second compartments 178, 180, extending from the frame 134 of the brake assembly 132 toward the tire 130 (see FIG. 2).

According to an exemplary embodiment, the shaft 144 of the brake member 136 includes two sections 210, 212, the first section 210 having a first width (e.g., first diameter) and the second section 212 having a second width (e.g., second diameter). The first width corresponds to the width of the aperture 184 in the cross-member portion 176. The second width corresponds to the width of the aperture 182 in the outward projection portion 170, which is less than the width of the aperture 184 in the cross-member portion 176.

In some embodiments, the shaft 144 is substantially cylindrical (e.g., round cross section), and the apertures 182, 184 are correspondingly circular. According to such an embodiment, differences in the diameters of the sections 210, 212 of the shaft 144 and the corresponding diameters of the apertures 182, 184 are on the order of a sixteen of an inch, or less. In other contemplated embodiments, the shaft and corresponding apertures may be rectangular or otherwise shaped and/or the shape of the shaft may not match the shape of corresponding apertures in the frame through which the shaft slides.

A flange 214 (e.g., ledge, hook, protrusion, sharp change in diameter, etc.) is formed in the shaft 144, between the first and second sections 210, 212 of the shaft 144. According to an exemplary embodiment, the flange 214 serves as a backstop for a spring member 216 (e.g., spring, coil spring, wave spring, leaf spring) that is coupled to the shaft 144 (e.g., positioned around the shaft 144), within the first compartment 178 of the frame 134. The other end of the spring member 216 is bound by the outward projection portion 170 of the frame 134. As such, the spring member 216 is compressed when the shaft 144 moves forward through the frame 134, and the flange 214 is moved closer to the outward projection portion 170. In such embodiments, the shaft 144 is accordingly biased by the spring member 216 toward a rearward or retracted position.

Still referring to FIGS. 4-5, the actuator 138 of the brake assembly 132 functions as a lever that rotates about the pivot 150 formed from a pin 218 (or pins) inserted through the apertures 186, 188 in the first and second rearward extension portions 172, 174 of the frame 134 and through the actuator 138. In some such embodiments, the pivot 150 is located in the second compartment 180 of the frame 134. The pin 218 may be capped on outside ends thereof, helping to prevent the pin 218 from sliding out of the apertures 186, 188 and actuator 138.

Opposite to the foot pedal 152 on the actuator 138, the cam 154 extends from the pin 190. According to an exemplary embodiment, the cam 154 includes two substantially flat surfaces 220, 222, each surface 220, 222 at a different distance from the pin 190. The two surfaces 220, 222 may be separated by a rounded, beveled, or sharp corner therebetween. A first surface 220 of the two surfaces 220, 222 engages an end of the shaft 144 when the actuator 138 is in the raised position (e.g., 90-degrees upward) (see also FIGS. 6-7). In such an embodiment, the first surface 220 is closer to the pin 190 than the second surface 222 of the two surfaces 220, 222. As such, when the actuator 138 is in the raised position, the spring member 216 biases the shaft toward the refracted position.

From the raised position, an operator may step down on the foot pedal 152 to rotate the actuator 138, aligning the second surface 222 of the cam 154 with the shaft 144. Because the second surface 222 is further from the pin 190 than the first surface 220, the shaft 144 is pushed forward through the frame 134 of the brake assembly 132 by the cam 154, to an extended position (see FIGS. 8-9, cf. FIGS. 6-7). Use of substantially flat surfaces 220, 222 on the cam 154 is intended to provide stable resting positions for the cam 154 and the shaft 144, despite compressive forces therebetween (e.g., caused by the spring member 216 and/or compression of the tire 130).

In other contemplated embodiments, the configuration of the first and second surfaces 220, 222 on the cam 154 is reversed—a first surface is further from the pin 190 than a second surface, such that the raised position of the actuator 138 corresponds to the extended position of the shaft 144. In still other contemplated embodiments, the arc of rotation for the actuator 138 is 30-degrees, 20-degrees, or other arc angles. In such embodiments, the surfaces of the cam 154 are adjusted accordingly so that the flat surface interfaces between the cam 154 and the shaft 144 correspond to the ends of the arc. Other embodiments include a cam without flat surfaces.

Still referring to FIGS. 4-5, the brake member 136 includes the shaft 144 and the brake surface 146 connected to the shaft 144. According to an exemplary embodiment, during assemblage of the brake assembly 132 the brake surface 146 is fastened to the end of the shaft 144 after the shaft 144 has been inserted through the apertures 182, 184 in the frame 134. In some embodiments, a brake surface 146 includes a metal stopper that is screwed onto an end of the shaft 144. In other embodiments, a brake surface may be integral with the shaft (e.g., an extension therefrom or an end thereof). In still other contemplated embodiments, the brake surface may be a separate piece of a non-metal material (e.g., rubber, ceramic, composite) coupled to the end of the shaft 144, such as a brake pad or a rubber coating.

Figure 6:
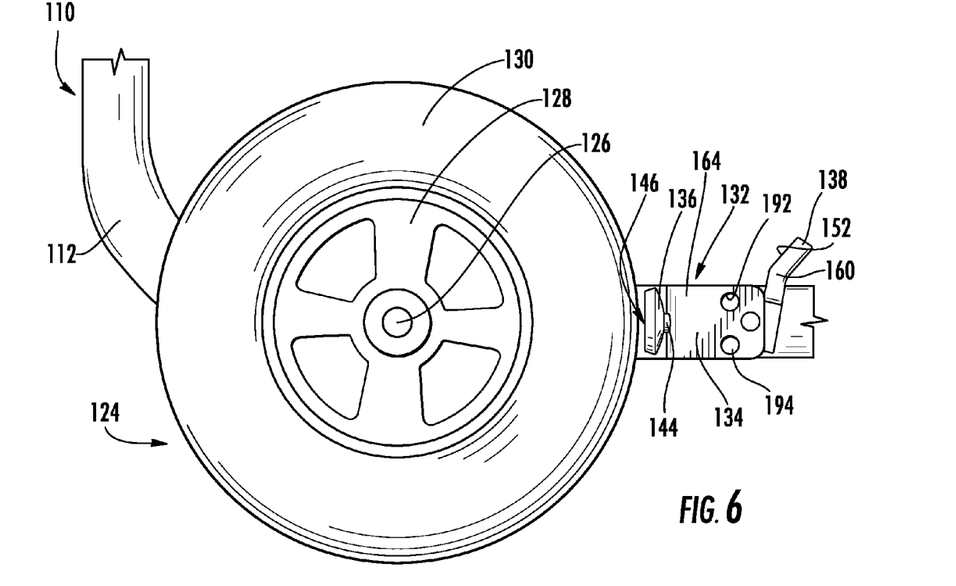
FIG. 6 is a side view of the wheel assembly of the portable generator of FIG. 1, in a first configuration.
Figure 7:
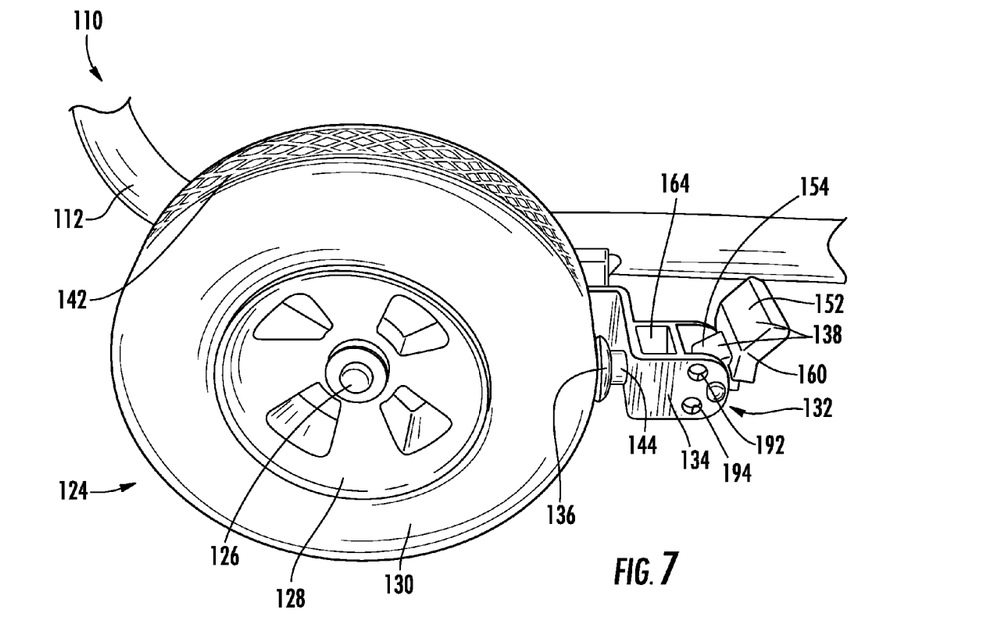
FIG. 7 is a perspective view of the wheel assembly of the portable generator of FIG. 1, in the first configuration (unlocked position of brake assembly).

Referring to FIGS. 6-7, the brake assembly 132 is in a first configuration (e.g., released position, un-braked configuration, free configuration). The foot pedal 152 of the actuator 138 is in the raised position, and the shaft 144 (and brake surface 146) of the brake member 136 are in the retracted position. Accordingly, the brake surface 146 is not contacting the tire 130. The tire 130 is free to rotate about the axle 126 of the wheel assembly 124, allowing an operator to move the portable generator 110 to a desired location for operation. Compare FIGS. 6-7 with FIGS. 8-9.

Figure 8:
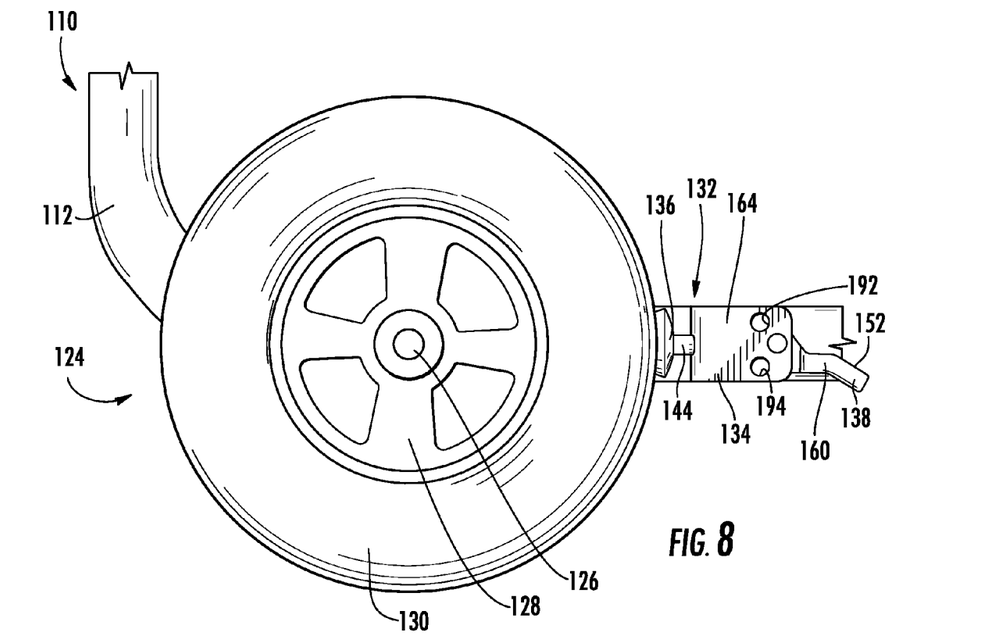
FIG. 8 is a side view of the wheel assembly of the portable generator of FIG. 1, in a second configuration (locked position of brake assembly).
Figure 9:
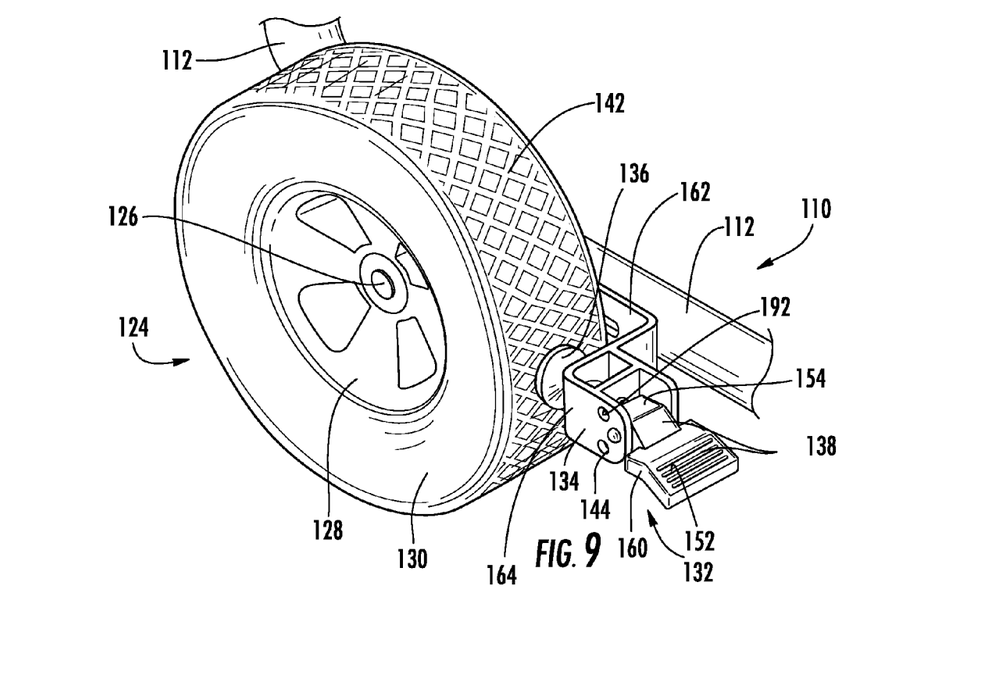
FIG. 9 is a perspective view of the wheel assembly of the portable generator of FIG. 1, in the second configuration (locked position of brake assembly).

Conversely, referring to FIGS. 8-9, the brake assembly 132 is in a second configuration (e.g., braked configuration, locked configuration). The foot pedal 152 is in the lowered position, and the shaft 144 (and brake surface 146) are in the extended position. The brake surface 146 is pushed into contact with the tire 130, partially compressing the tire 130. In such a configuration, frictional forces (and other stresses) between the tire 130 and the brake surface 146 interlock the wheel assembly 124, limiting the mobility of the portable generator 110 (i.e., braking the portable generator 110).

Figure 10:
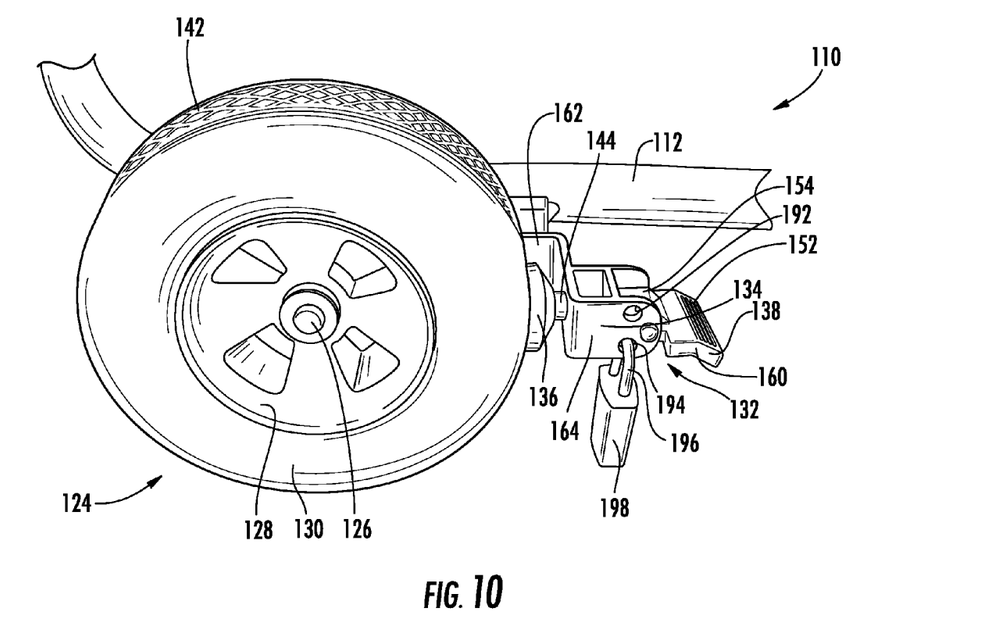
FIG. 10 is a perspective view of the wheel assembly of the portable generator of FIG. 1, in a third configuration (locked position with addition of external lock).

Referring now to FIG. 10, the brake assembly 132 is in a third configuration. According to an exemplary embodiment, at least one of the holes 192, 194 in the second rearward extension portion 174 (see FIGS. 4-5) of the frame 134 of the brake assembly 132 allows for padlocking of the actuator 138 in the lowered position, with the portable generator 110 braked. The shackle 196 (i.e., arm, locking bar) of the padlock 198 (e.g., commercially-available combination or key lock) extends through at least one of the holes 192, 194 (e.g., lower hole 194), when the actuator 138 is in the lowered position. With the shackle 196 through at least one of the holes 192, 194, the actuator 138 is unable to rotate upward to release the shaft 144 from the tire 130.

Use of the padlock 198 prevents unauthorized removal of the shackle 196. However, a chain, a wire, a pin, or another object may be inserted through at least one of the holes 192, 194 to lock the brake assembly 132. In some embodiments, insertion of the shackle 196 of the padlock 198 through the upper hole 192, when the actuator 138 is in the raised position, locks the brake assembly in the first configuration (see FIGS. 6-7). Insertion of the shackle 196 through the lower hole 194, when the actuator 138 is in the lowered position, locks the brake assembly in the second configuration (see FIGS. 8-9).

Figure 11:
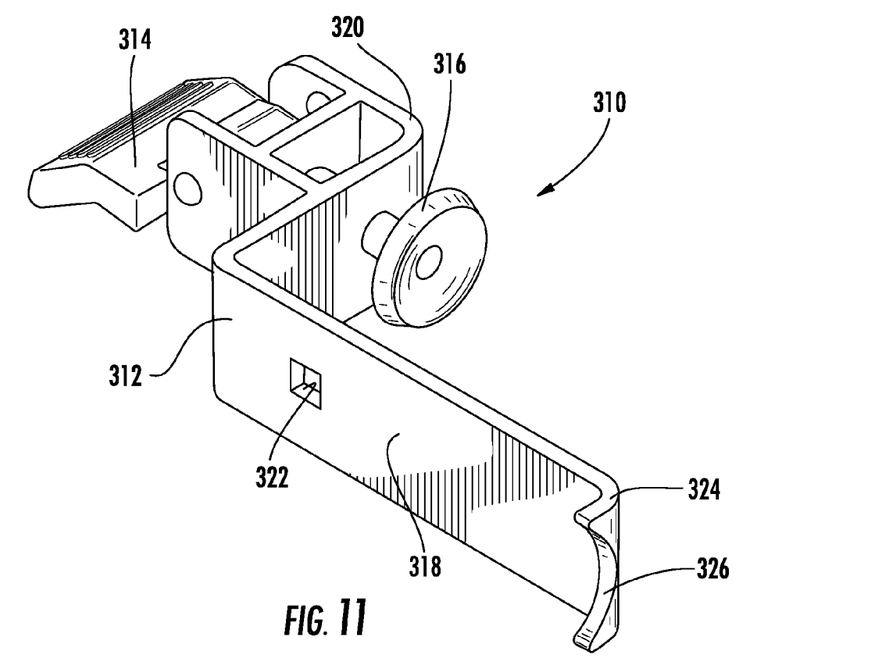
FIG. 11 a first perspective view of a brake assembly according to another embodiment of the invention.
Figure 12:
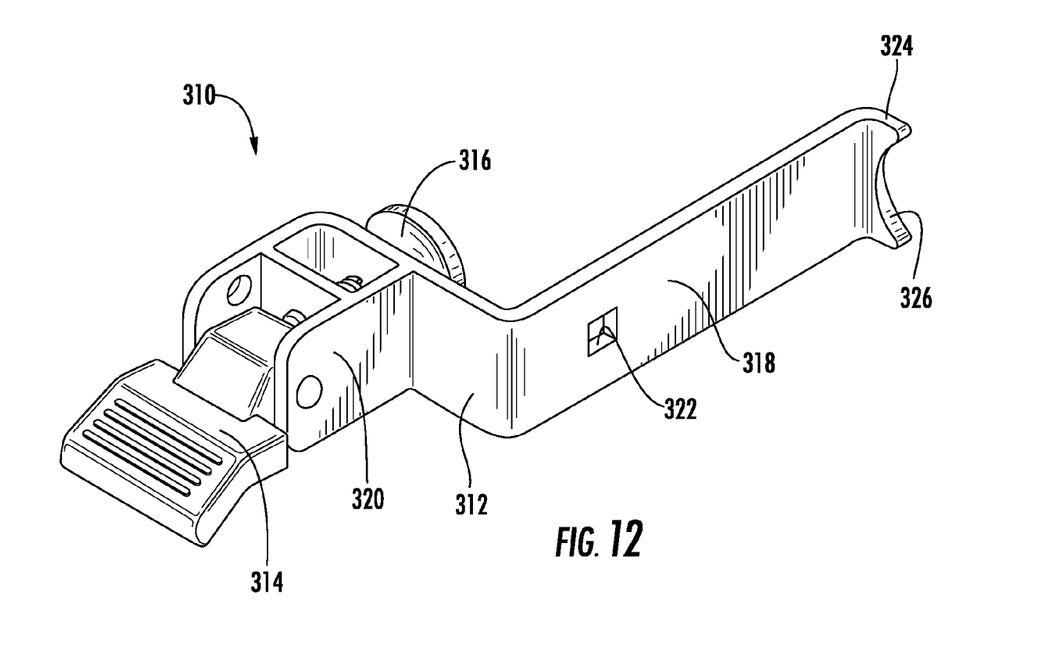
FIG. 12 is a second perspective view of the brake assembly of FIG. 11.

Referring now to FIG. 11-12, a brake assembly 310 includes a frame 312, an actuator 314, and a locking member 316. The frame 312 includes a bracket portion 318 connected to a support portion 320, where the actuator 314 and locking member 316 are supported by the support portion 320. In general, the actuator 314 and the locking member 316 are structurally and functionally similar to those disclosed with regard to the brake assembly 132.

The bracket portion 318 includes an aperture 322 for inserting a fastener (see, e.g., fasteners 140 as shown in FIG. 2) through the frame 312, to attach the frame 312 to portable equipment. In some embodiments, a threaded fastener, such as a bolt, may be inserted through the aperture 322. The bracket portion 318 also includes a hook portion 324 (e.g., curve, catch) on an end thereof, which includes a slot 326 therein. The slot 326 is sized to fit a tubular member of a support frame for the portable equipment. As such, the slot 326 of the hook portion 324 extends around the tubular member, and the fastener then pins the bracket portion 318 of the frame 312 to the tubular member of the portable equipment.

In other contemplated embodiments, the brake member may be designed to interlock portions of the wheel assembly other than the tire (see, e.g., wheel assembly 124 and tire 130 as shown in FIG. 2). In one such embodiment, an axle includes a sprocket and the end of the brake member includes apertures for teeth of the sprocket to selectively engage. In another such embodiment, a friction belt extends around a sheave or drum coupled to either the wheel or the axle of the wheel assembly. When the brake assembly is in a first configuration, the belt is loose on the sheave or drum, and provides little resistance to rotation thereof. However, when the brake assembly is in a second configuration, tension is added to the belt, and friction between the belt and sheave or drum limits rotation of the wheels. Such embodiments may include a feature for attachment of a padlock, to lock the portable equipment in a braked configuration.

The construction and arrangements of the braking assembly and portable equipment, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A brake assembly for use with a portable generator, comprising:
   a frame configured to be coupled to the portable generator;
   a plurality of wheels coupled to the frame proximate a first end of the frame and allowing rolling movement of the portable generator;
   a shaft supported by the frame;
   a brake surface on an end of the shaft; and
   an actuator, comprising:
      a foot pedal,
      a cam,
      a spring, and
      a pivot, the pivot coupled to both the foot pedal and the cam, the pivot providing for rotation of the foot pedal and the cam about a portion of the frame;

wherein the frame includes a first opening and a second opening formed therein, the first opening aligned with the second opening, and wherein the shaft extends through the first and second openings;

wherein the cam of the actuator translates the shaft between a released position and a braked position in which the brake surface engages one of the wheels to prevent rotation of the wheel during operation of the brake assembly;

wherein the cam includes a first flat surface corresponding to the released position of the shaft and a second flat surface corresponding to the braked position of the shaft when in contact therewith;

wherein the spring biases the shaft towards the released position and the spring is positioned between the first and second openings of the frame; and wherein the actuator is located between the wheel and a second end of the frame opposite the first end.

2. The brake assembly of claim 1, wherein the first opening of the frame is wider than the second opening.

3. The brake assembly of claim 2, wherein the shaft includes a first section of a first diameter and a second section of a second diameter, and wherein the first section extends through the first opening of the frame and the second section extends through the second opening.

4. The brake assembly of claim 3, wherein the spring is positioned between the first section of the shaft and the second opening of the frame.

5. A brake assembly for use with portable equipment, comprising:
a frame configured to be coupled to the portable equipment;
a plurality of wheels coupled to the frame proximate a first end of the frame and allowing rolling movement of the portable equipment;
a shaft supported by the frame;
a brake surface on an end of the shaft;
a spring;
a lever coupled to the shaft and pivotable about a portion of the frame, the lever movable between a released position and a braked position, wherein movement of the lever translates the shaft so that with the lever in the braked position the brake surface engages one of the wheels to prevent rotation of the wheel, wherein the lever comprises a foot pedal and a cam opposite to the foot pedal, and wherein rotation of the cam moves the shaft, wherein the cam comprises at least two substantially flat surfaces, one surface engaging the shaft when the lever is in the released position and the other surface engaging the shaft when the lever is in the braked position; and
a locking feature comprising an aperture formed in the frame, wherein the aperture is sized and positioned in the frame such that a shackle of a padlock may be placed therethrough when the lever is in the braked position, locking the lever in the braked position;
wherein the spring biases the shaft towards the cam;
wherein the frame includes a first opening and a second opening formed therein, the second opening aligned with the first opening, and wherein the shaft extends through the first and second openings;

wherein the shaft includes a first section of a first diameter and a second section of a second diameter, and wherein the first section extends through the first opening of the frame and the second section extends through the second opening of the frame;

wherein the spring is positioned between the first section of the shaft and the second opening of the frame; and wherein the lever is located between the wheel and a second end of the frame opposite the first end.

6. Portable equipment, comprising:
a wheel assembly comprising at least one of an axle and a wheel, the wheel assembly located proximate a first end of the portable equipment;
a frame;
a brake member comprising:
a shaft supported by the frame, and
a brake surface connected to the shaft; and
an actuator for the brake member, comprising:
a foot pedal,
a cam coupled to the foot pedal,
a spring, and
a pivot coupled to both the foot pedal and the cam, the pivot providing for rotation of the foot pedal and the cam about a portion of the frame;
wherein the frame includes a first opening and a second opening formed therein, the first opening aligned with the second opening, and wherein the shaft extends through the first and second openings;
wherein operation of the foot pedal rotates the cam, which translates the shaft relative to the wheel assembly, selectively engaging or disengaging the brake surface with the wheel to brake or release the portable equipment;
wherein the cam includes a first flat surface corresponding to a disengaged position of the shaft and a second flat surface corresponding to an engaged position of the shaft when in contact therewith;
wherein the spring biases the shaft towards the disengaged position and the spring is positioned between the first and second openings of the frame; and
wherein the actuator is located between the wheel assembly and a second end of the portable equipment opposite the first end.

7. The portable equipment of claim 6, wherein the frame supports at least one of the brake member and the actuator, wherein the frame comprises an aperture having at least an eighth-of-an-inch diameter, and wherein the aperture is positioned in the frame so as to allow use of a shackle of a pad lock to be inserted therethrough to restrict movement of at least one of the brake member and the actuator.

8. The portable equipment of claim 7, wherein the wheel assembly is positioned on a bottom of the portable equipment.

9. The portable equipment of claim 8, wherein the brake surface selectively engages a tire of the wheel during operational use of the portable equipment.

10. The portable equipment of claim 9, wherein the portable equipment further comprises:
a generator set for producing electricity.

11. The portable equipment of claim 10, wherein the first flat surface and the second flat surface are each a different distance from the pivot.

* * * * *